(12) United States Patent
Arnault et al.

(10) Patent No.: US 10,619,680 B2
(45) Date of Patent: Apr. 14, 2020

(54) CLUTCH THRUST BEARING DEVICE INCLUDING A BALL BEARING, AND DRIVELINE SYSTEM INCLUDING SUCH A DEVICE

(71) Applicant: Aktiebolaget SKF, Gothenburg (SE)

(72) Inventors: Benoit Arnault, Saint-Cyr-sur-Loire (FR); Robert D. Pecak, Naperville, IL (US); Thomas Perrotin, Saint Roch (FR); Pramod Srinivas, Bergisch Gladbach (DE); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 26 days.

(21) Appl. No.: 15/915,465

(22) Filed: Mar. 8, 2018

(65) Prior Publication Data
US 2019/0277347 A1 Sep. 12, 2019

(51) Int. Cl.
*F16D 23/14* (2006.01)
*F16C 19/16* (2006.01)
*F16D 25/08* (2006.01)
*B60K 23/08* (2006.01)

(52) U.S. Cl.
CPC .............. *F16D 23/14* (2013.01); *F16C 19/16* (2013.01); *F16D 25/08* (2013.01); *B60K 23/08* (2013.01); *F16C 2326/06* (2013.01); *F16D 23/142* (2013.01)

(58) Field of Classification Search
None
See application file for complete search history.

(56) References Cited

U.S. PATENT DOCUMENTS

| | | | | |
|---|---|---|---|---|
| 4,526,258 A | * | 7/1985 | Huber | F16D 25/048 |
| | | | | 192/85.15 |
| 4,606,449 A | * | 8/1986 | Lederman | F16D 25/044 |
| | | | | 192/85.15 |
| 6,189,670 B1 | * | 2/2001 | Ponson | F16D 23/142 |
| | | | | 192/85.51 |
| 2001/0011626 A1 | * | 8/2001 | Meyer | F16D 25/083 |
| | | | | 192/85.51 |
| 2003/0010595 A1 | * | 1/2003 | Heller | F16D 25/083 |
| | | | | 192/85.51 |
| 2005/0265646 A1 | * | 12/2005 | Arnault | F16D 19/163 |
| | | | | 384/612 |

* cited by examiner

*Primary Examiner* — Charles A Fox
*Assistant Examiner* — Ryan P Dodd
(74) *Attorney, Agent, or Firm* — Garcia-Zamor Intellectual Property Law, LLC; Ruy Garcia-Zamor; Bryan Peckjian

(57) ABSTRACT

A clutch thrust bearing device having a ball bearing with a fixed inner ring, a rotatable outer ring, and at least one series of balls located in a raceway chamber disposed between the rings. The device also provides a piston having a substantially radial portion, the fixed inner ring being in axial abutment against the substantially radial portion. The piston further provides an axial portion arranged in a bore of the fixed inner ring of the ball bearing, the axial portion being provided with at least one outwards radial projection that extends between the fixed inner ring and the rotatable outer ring.

7 Claims, 2 Drawing Sheets

CLUTCH THRUST BEARING DEVICE INCLUDING A BALL BEARING, AND DRIVELINE SYSTEM INCLUDING SUCH A DEVICE

TECHNOLOGICAL FIELD

The present invention relates to a clutch thrust bearing device including such a bearing. The invention relates in particular to a driveline system including such a device, the system being provided to an all-wheel drive driveline system of a motor vehicle.

BACKGROUND

An all-wheel drive driveline system for a motor vehicle generally comprises a primary front drive axle coupled to a secondary or rear drive axle.

When only two wheels of a four-wheels vehicle operate as driving wheel, the rear drive system including the rear drive axle and rear wheels may be disconnected from the front drive system including the front drive axle and front wheels. Furthermore, it could be desirable to disconnect only one of or both rear wheels depending on the operation mode of the motor vehicle.

For this purpose, it is known to provide a rear drive module to the rear drive system, the rear drive module including clutch thrust devices to distribute torque between the front and rear axle, and between the two wheels. Clutch thrust devices are also able to disconnect the rear drive system, the wheel being uncoupled to driveline. It is also known rear drive modules including two clutches, each of the clutches being able to disconnect one rear wheel from the driveline.

Such rear drive modules enables a motor vehicle with off-road capabilities, and on-road high performances, in particular with efficient stability, efficient dynamic operation and also low fuel consumption.

Advantageously, the clutch thrust devices are of the well-known multi-plate types and include an axially movable piston disposed within a cavity between a clutch bearing and a housing, the piston cavity being connected to a source of hydraulic fluid which may variably provide pressurized fluid in the cavity to axially move the piston. Clutch thrust devices further include a resilient biasing member exerting an axial preload onto the clutch bearing. The clutch bearing is able to axially move by the piston movement and then actuates a coupling member engaging the plates. It is known to use a clutch bearing with a plurality of needles.

It is desirable to further improve the performances of such rear drive module, in particular by limiting the friction torque within the module and in particular in the clutch bearing to further reduce the vehicle fuel consumption.

SUMMARY

The aim of the invention is to overcome these drawbacks by proposing a clutch thrust bearing device including a ball bearing, in particular for use in a rear drive module of a driveline system of a motor vehicle, able to transmit an axial force from an axially movable piston to a resilient biasing member, of reduced friction torque, and of easy and low-cost manufacturing process.

To this end, the invention relates to a clutch thrust bearing device comprising a ball bearing with a fixed inner ring, a rotatable outer ring, and at least one series of balls located in a raceway chamber defined between the rings.

The device further comprises a piston having a substantially radial portion, the fixed inner ring being in axial abutment against the substantially radial portion.

According to the invention, the piston further comprises an axial portion that axially extends from a bore of the substantially radial portion, the axial portion being arranged in a bore of the fixed inner ring of ball bearing. The axial portion is provided with at least one outwards radial projection that extends between the fixed inner ring and the rotatable outer ring.

According to further aspects of the invention which are advantageous but not compulsory, such a ball bearing may incorporate one or several of the following features:

The clutch thrust bearing device comprises a housing having an annular cavity with a bottom surface, an inner lateral wall and an outer lateral wall, the piston being disposed within the cavity between the bottom surface and the ball bearing, the axial portion of piston being radially arranged between the fixed inner ring and the inner lateral wall of housing.

The substantially radial portion of piston extends between the lateral walls of the cavity, and is sealed with the the walls.

The bore of piston comprises inner sealing means having at least one sealing lip in sliding contact with the inner lateral wall of cavity.

The essentially radial portion of piston comprises outer sealing means provided to outer side of the substantially radial portion, having at least one sealing lip in sliding contact with the outer lateral wall of cavity.

The cavity is connected to a source of hydraulic fluid which may variably provide pressurized fluid in the cavity to axially move the piston.

The fixed inner ring has a toroidal portion of outside toroidal surface forming an inner raceway for the balls, and a radial portion that outwardly radially extends from the toroidal portion, the radial portion being in axial abutment against the essentially radial portion of piston.

The outwards radial projection cooperates with an axial surface formed by a free edge of the fixed inner ring.

The outwards radial projection cooperates with the fixed inner ring, the the ring being axially clamped within the piston.

The outwards radial projection comprises an axial surface that axially faces the axial surface of an edge of the fixed inner ring.

The outwards radial projection is a frustoconical lip.

The piston further comprises at least one axial rib to strengthen the frustoconical lip.

The rotatable outer ring has a toroidal portion of inner toroidal surface forming an outer raceway for the balls.

The rotatable outer ring further comprises a radial portion that inwardly radially extends from inner side of the toroidal portion.

The ball bearing further comprises an annular cage comprising an annular heel, and a plurality of pockets that receive each a ball.

The annular heel of cage is axially arranged between a free edge of the toroidal portion of the fixed inner ring, and the radial portion of the rotatable outer ring.

The annular heel comprises an annular recess, the outwards radial projection of piston being at least partly arranged within the the recess.

The inner ring and the outer ring are made of tempered steel.

The axial portion of piston is tubular.

The outwards radial projection is annular.

The piston comprises a plurality of outwards radial projections.

The outwards radial projection is made from an elastically deformable material.

The outwards radial projection is made from a rubber material, for example polyamide.

The outwards radial projection is overmoulded onto the axial portion of piston.

The outwards radial projection and the inner sealing means of piston are formed from the same material during a common overmoulding process.

The invention also relates to a driveline system of a motor vehicle comprising such a clutch thrust bearing device according to the invention for selectively connecting or disconnecting at least one wheel from the driveline system.

Advantageously, the driveline system comprises a front drive system including a front drive axle and front wheels, and a rear drive system including a rear drive axle, a rear drive module and rear wheels, the rear drive module being provided with clutch thrust bearing devices according to the invention in series, each being able to selectively connect or disconnect one of the rear wheels.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
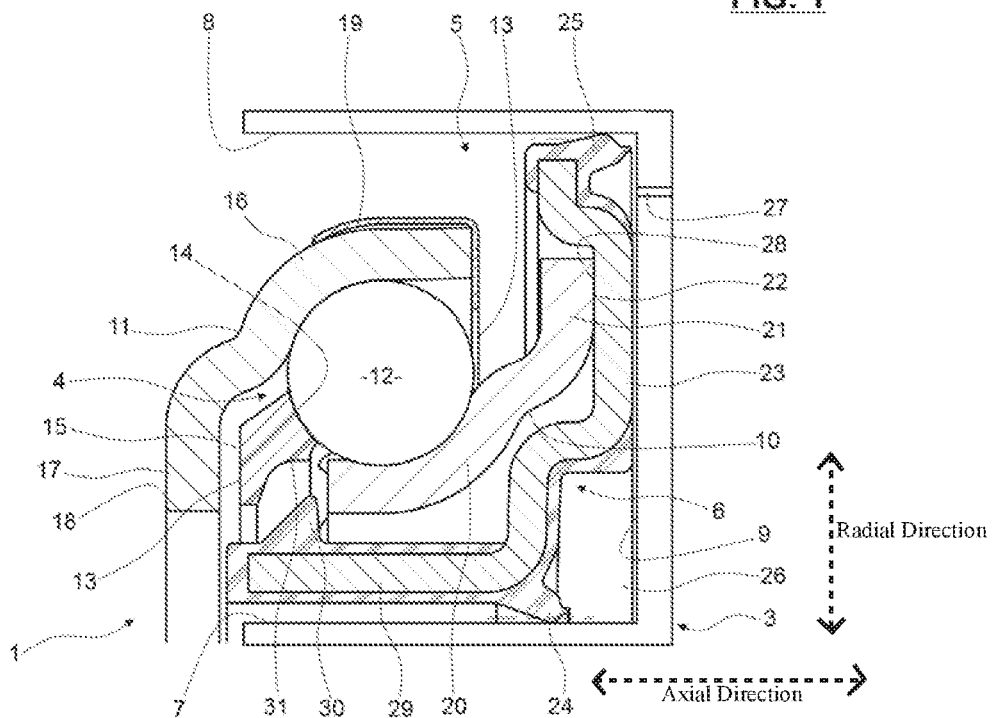
FIG. 1 is a view of an axial section of a clutch thrust bearing device according to a first embodiment of the invention.

The clutch thrust bearing device 1 is advantageously integrated in a driveline system of a motor vehicle, not represented. The clutch thrust bearing device 1 is essentially annular and centered on a central axis.

The clutch thrust bearing device 1 comprises a fixed housing 3, a ball bearing 4, the fixed housing 3 and ball bearing 4 defining a cavity 5 wherein an axially movable piston 6 is arranged.

A resilient biasing member (not represented), for example a wavy spring, may apply a preload on the ball bearing 4.

The housing 3 is fixed, and advantageously is a part of a rear drive module provided to the driveline system. The housing comprises an annular cavity 5 centered on the central axis. The cavity 5 is defined between an inner lateral wall 7, an outer lateral wall 8, and a bottom surface 9, the cavity 5 being axially open to the ball bearing 4.

The ball bearing 4 is annular and centered on the central axis. The ball bearing 4 is at least partly arranged in the cavity 5 of housing 3, the piston 6 being axially interposed between the bottom surface 9 of the cavity 5 and the ball bearing 4. The lateral walls 7, 8 of cavity 5 permits the lateral guidance of the ball bearing 4.

The ball bearing 4 comprises a fixed inner ring 10, a rotatable outer ring 11, and one series of balls 12 located in a raceway chamber 13 defined between the rings 10, 11. The balls 12 are circumferentially equally spaced and held by a cage 13, each of the balls 12 being arranged in a corresponding pocket 14 provided circumferentially to an annular heel 15. In the illustrated embodiment, the heel 15 is axially arranged between a free edge of the toroidal portion 20 of the fixed inner ring 10, and the radial portion 17 of the rotatable outer ring 11. A ball bearing 4 provided with balls 12 as rolling elements between rings 10, 11 is of reduced friction torque compared to other types of rolling bearings, provided with rollers or needles.

The rotatable outer ring 11 comprises a toroidal portion 16 of inner toroidal surface forming an outer raceway for the balls 12.

Advantageously, the rotatable outer ring 11 further comprises a radial portion 17 that outwardly radially extends from an inner side of the toroidal portion 16. The radial portion 17 has an axial contact surface 18 suitable to actuate a coupling member (not represented) that engages plates (not represented) to connect one wheel to the driveline system of the vehicle.

Advantageously, the toroidal portion 16 of rotatable outer ring 11 is provided with a flange 19. Flange 19 has a tubular outer portion covering the toroidal portion 16, and a downwards radial projection that maintains the balls 12 in the rolling chamber 13.

The fixed inner ring 10 comprises a toroidal portion 20 of outside toroidal surface forming an inner raceway for the balls 12, and a radial portion 21 that outwardly radially extends from the toroidal portion 20. The radial portion 21 has an axial contact surface 22 in axial abutment against the axially movable piston 6. The ball bearing 4 is set in axial movement by the transmission of the movement of piston 6 to the axial contact surface 22 of fixed inner ring 10.

The piston 6 is annular, is centered on the central axis, and is arranged within the cavity 5 of housing 3. The piston 6 comprises a substantially radial portion 23 extending radially between the two lateral walls 7, 8 of cavity 5. Advantageously, the piston 6 further comprises inner sealing means 24 provided to inner bore of radial portion 23, the sealing means being provided with a sealing lip in sliding contact with the inner lateral wall 7 of cavity 5. The piston 6 also comprises outer sealing means 25 provided to outer side of radial portion 23, the sealing means being provided with a sealing lip in sliding contact with the outer lateral wall 8 of cavity 5.

The piston 6, the lateral walls 7 and 8 and the bottom surface 9 define a sealed cavity 26. At least one channel 27 is provided through the housing 3 so as to connect the sealed cavity 26 with a source of hydraulic fluid (not represented) which may variably provide pressurized fluid in the sealed cavity 26 to axially move the piston 6.

In the present embodiment, the substantially radial portion 23 of piston 6 has a shape adapted to the fixed inner ring 10 of ball bearing 4. The substantially radial portion 1 comprises an annular groove 28 wherein the radial portion 21 of the fixed inner ring 10 is arranged, the contact surface 22 being in axial abutment against the bottom surface of the groove 20. Alternatively, the substantially radial portion 23 may have any other suitable shape.

According to the invention, the piston 6 further comprises an axial portion 29 that axially extends from a bore of the substantially radial portion 23. In the illustrated embodiment of the invention in FIGS. 1 and 2, the axial portion 29 is tubular. Alternatively, the axial portion may be discrete, the piston comprising a plurality of axial tongues.

The axial portion 29 extends in a bore of the fixed inner ring 10 of ball bearing 4. More precisely, the axial portion 29 is radially arranged between a bore defined by the toroidal portion 20 of the fixed inner ring 10, and the inner lateral wall 7 of the cavity 5 provided to the housing 3. The fixed inner ring 10 then radially surrounds the axial portion 29 of piston 6.

Figure 2:
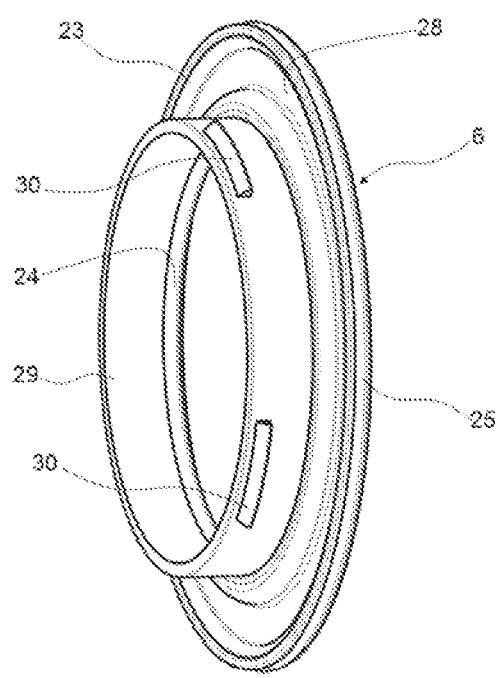
FIG. 2 is a perspective view of a piston for the device of FIG. 1.

As illustrated in FIGS. 1 and 2, the axial portion 29 comprises a plurality of outwards radial projections 30. The outwards radial projections 30 are provided to the inner cylindrical surface of the axial portion 29. As an alternate not represented, the piston 6 may comprise an annular outwards radial projection. The projections 30 extend between the radial portion 17 of rotatable outer ring 11 and a free edge of the toroidal portion 20 of fixed inner ring 10.

The projections 30 are of substantial triangle shape, and provide an axial surface facing an axial surface of the free edge of toroidal portion 20 of the fixed inner ring 10. The projections 30 and the fixed inner ring 10 cooperate together, the the ring 10 being axially clamped within the piston 6. The ring 10 is axially and radially retained by the piston 6.

Advantageously, the annular heel 15 of cage 13 comprises an annular recess 31, the outwards radial projections 30 of piston 6 being at least partly arranged within the the recess 31. Such a cage permits to limit that axial length of the ball bearing mounted with the piston.

According to an advantageous embodiment, the outwards radial projections 30 are made from a plastically deformable material, for example a rubber material, and are fixed to the axial portion 29 of piston 6. The fixed inner ring 10 can then be easily inserted within the piston 6, the outwards radial projection 30 being elastically deformed during the insertion of inner ring 2.

The outwards radial projections 30 are preferably overmoulded onto the axial portion 29 of piston 6. In the present embodiment, the outwards radial projections 30 and the inner sealing means 24 of piston 6 are formed from the same material during a common overmoulding process. Such a piston 6 is relatively simple to manufacture, and of well-known and reliable manufacturing process.

Figure 3:
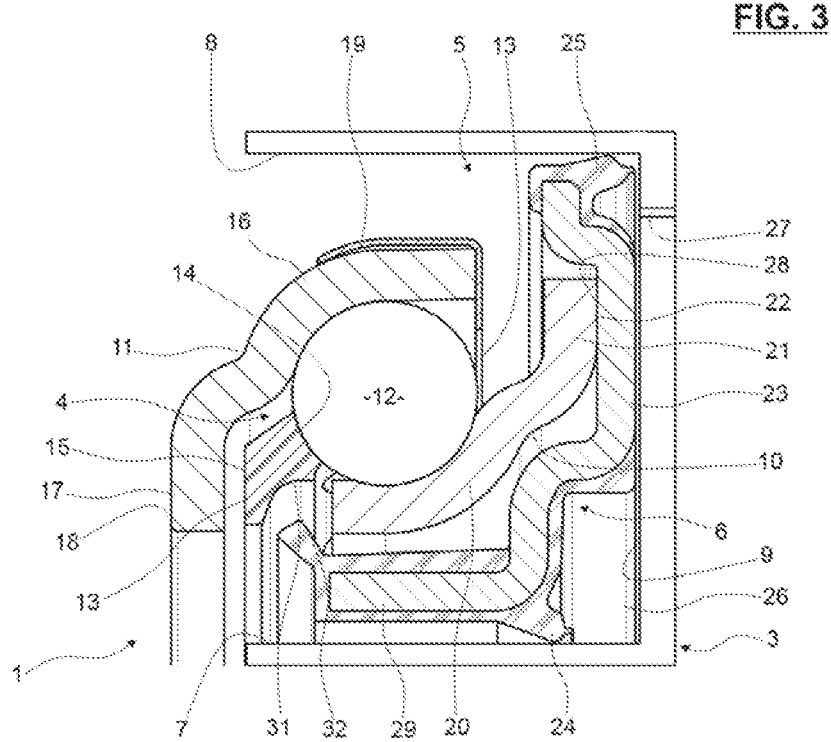
FIG. 3 is a view of an axial section of a clutch thrust bearing device according to a second embodiment of the invention.
Figure 4:
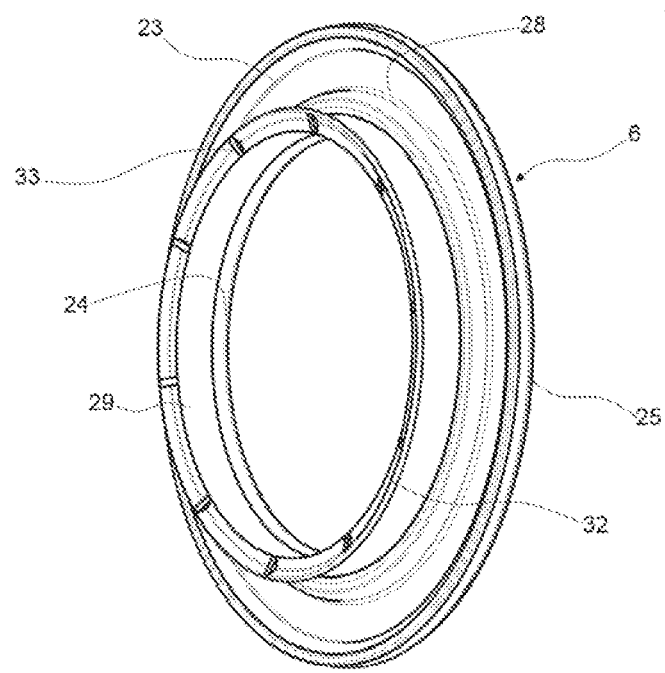
FIG. 4 is a perspective view of a piston for the device of FIG. 3.

According to a second embodiment of the invention illustrated in the FIGS. 3 and 4, wherein the same elements have the same references, the axial portion 29 of piston 6 comprises an annular outwards radial projection 32 that consists in a frustoconical lip.

The frustoconical lip 32 extends obliquely with respect the axial surface of free edge of the toroidal portion 20 of the fixed inner ring 10. The frustoconical lip 32 is arranged in the annular recess 31 provided to the annular heel 15 of cage 13.

As illustrated in FIG. 4, the piston 6 further comprises advantageously a plurality of axial ribs 33 to strengthen the frustoconical lip 32.

Advantageously, the inner ring 10 and the outer ring 11 are made of tempered steel. The rings 10, 11 are advantageously stamped from a metal blank sheet and are of simple and cost effective construction. The clutch thrust bearing device does not require additional element or elements of complex shape to ensure the connection and disconnection functions. The piston 6 is also advantageously made from a stamped metal blank sheet, the sealing means 24, 25 and the outwards radial projections 30, 32 being overmoulded to the piston 6 from a rubber material. Alternatively, the piston 6 may be made of a rigid plastic material.

The clutch thrust bearing device 1 works as followed:

The axial movement of the piston 6 is transferred to the ball bearing 4, and the connection/disconnection of the rear drive module to the driveline system is actuated by the supplying of pressurized fluid in the sealed chamber 26.

When pressurized fluid in supplied in the sealed chamber 26 through channel 27 of housing 3, the piston 6 is pushed by the fluid. Piston 6 transmits a forward axial movement to the ball bearing 4 by the intermediate of contact surface 22 of inner ring 10. Contact surface 18 of outer ring 11 actuates a coupling member (not shown) that engages plates (not shown) to connect one wheel to the driveline system of the vehicle. A resilient biasing member (not represented) may be axially compressed by the ball bearing 4 axial forward movement, by the intermediate of outer ring 11.

When pressurized fluid is not supplied anymore to the sealed chamber 26, the resilient biasing member pushes the ball bearing 4 into a backward axial movement. The contact surface 18 of outer ring 11 does not actuate anymore the coupling member to disconnect one wheel to the driveline system. The piston 6 is pushed back to its initial position by the intermediate of contact surface 22 of inner ring 10, the fluid in sealed chamber 26 being removed through channel 27.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved ball bearing.

Moreover, various features of the above-described representative examples, as well as the various independent and dependant claims below, may be combined in ways that are not specifically and explicitly enumerated in order to provide additional useful embodiments of the present teachings.

What is claimed is:

1. A clutch thrust bearing device comprising:
    a ball bearing having a fixed inner ring, a rotatable outer ring, and at least one series of balls located in a raceway chamber disposed between the rings, and
    a piston having a substantially radial portion, the fixed inner ring being in axial abutment against the substantially radial portion, an axial portion extends axially from the substantially radial portion, the axial portion being arranged radially inside the fixed inner ring of the ball bearing, the axial portion being provided with at least one outwards radial projection that extends between the fixed inner ring and the rotatable outer ring,
    a housing having an annular cavity with a bottom surface, an inner lateral wall and an outer lateral wall, the piston being disposed within the cavity between the bottom surface and the ball bearing, the axial portion of piston being radially arranged between the fixed inner ring and the inner lateral wall of housing,
    wherein the substantially radial portion of the piston extends between the lateral walls of the cavity and is sealed with the walls, the piston having an inner sealing means extending radially inwardly from the substantially axial portion of the piston, the at least one sealing means comprising at least one sealing lip in sliding contact with the inner lateral wall of the cavity, and outer sealing means being provided to the outer side of the substantially radial portion of the piston and having at least one sealing lip in sliding contact with the outer lateral wall of the cavity.

2. A clutch thrust bearing device comprising:
a ball bearing having a fixed inner ring, a rotatable outer ring, and at least one series of balls located in a raceway chamber disposed between the rings, and
a piston having a substantially radial portion, the fixed inner ring being in axial abutment against the substantially radial portion, an axial portion extends axially from the substantially radial portion, the axial portion being arranged radially inside the fixed inner ring of the ball bearing, the axial portion being provided with at least one outwards radial projection that extends between the fixed inner ring and the rotatable outer ring,
wherein the fixed inner ring has a toroidal portion of outside toroidal surface forming an inner raceway for the balls, and a radial portion that outwardly radially extends from the toroidal portion, the radial portion being in axial abutment against the substantially radial portion of piston, the outwards radial projection of the piston cooperating with a radial surface formed by a free edge of the fixed inner ring.

3. The clutch thrust bearing device according to claim 2, wherein the outwards radial projection provides radial surface that axially faces the radial surface of the free edge of the fixed inner ring.

4. The clutch thrust bearing device according to claim 2, wherein the ball bearing further comprises an annular cage having a plurality of pockets that receive each a ball, and an heel that is axially arranged between a free edge of the toroidal portion of the fixed inner ring, and a radial portion of the rotatable outer ring, the annular heel comprising an annular recess, the outwards radial projection of the piston being at least partly arranged within the recess.

5. A clutch thrust bearing device comprising:
a ball bearing having a fixed inner ring, a rotatable outer ring, and at least one series of balls located in a raceway chamber disposed between the rings, and
a piston having a substantially radial portion, the fixed inner ring being in axial abutment against the substantially radial portion, an axial portion extends axially from the substantially radial portion, the axial portion being arranged radially inside the fixed inner ring of the ball bearing, the axial portion being provided with at least one outwards radial projection that extends between the fixed inner ring and the rotatable outer ring, wherein the outwards radial projection is made from a rubber material that is overmoulded onto the axial portion of the piston.

6. The clutch thrust bearing device according to claim 5, wherein the outwards radial projection is a frustoconical lip.

7. The clutch thrust bearing device according to claim 5, further comprising a housing having an annular cavity with a bottom surface, an inner lateral wall and an outer lateral wall, the piston being disposed within the cavity between the bottom surface and the ball bearing, the axial portion of piston being radially arranged between the fixed inner ring and the inner lateral wall of housing.

* * * * *